United States Patent [19]

Demarest et al.

[11] Patent Number: 4,841,669

[45] Date of Patent: Jun. 27, 1989

[54] INSECT BAIT DEVICE

[75] Inventors: Scott W. Demarest; John Martin; John H. Hainze; Stanley J. Flashinski, all of Racine, Wis.

[73] Assignee: S. C. Johnson & Son, Inc., Racine, Wis.

[21] Appl. No.: 233,304

[22] Filed: Aug. 17, 1988

Related U.S. Application Data

[62] Division of Ser. No. 69,338, Jul. 2, 1987, Pat. No. 4,823,506.

[51] Int. Cl.⁴ ............................................. A01M 1/02
[52] U.S. Cl. ........................................ 43/131; 43/114
[58] Field of Search .............. 43/107, 114, 131, 132.1

[56]            References Cited
         U.S. PATENT DOCUMENTS 3,747,260  7/1973  Loveness ............................ 43/131
4,395,842  8/1983  Margulies .......................... 43/114
4,438,584  3/1984  Baker ................................. 43/114
4,685,244  8/1987  Marks ................................ 43/114

FOREIGN PATENT DOCUMENTS 104509  4/1963  Netherlands ........................ 43/131

Primary Examiner—Kurt Rowan

[57] ABSTRACT

An insect bait device for exterminating crawling insects is disclosed. The device comprises a housing that includes substantially identical first and second housing portions. The housing portions, when joined together, define means for entry into the device by an insect. An absorbent pad impregnated with an insecticide composition is removably retained in one of the housing portions; or such a pad is removably retained in each of the first and second housing portions to provide an insect bait device which may utilize either of its housing portions as its base. A method of manufacturing the insect bait device as well as a preferred insecticide composition are also disclosed.

5 Claims, 2 Drawing Sheets

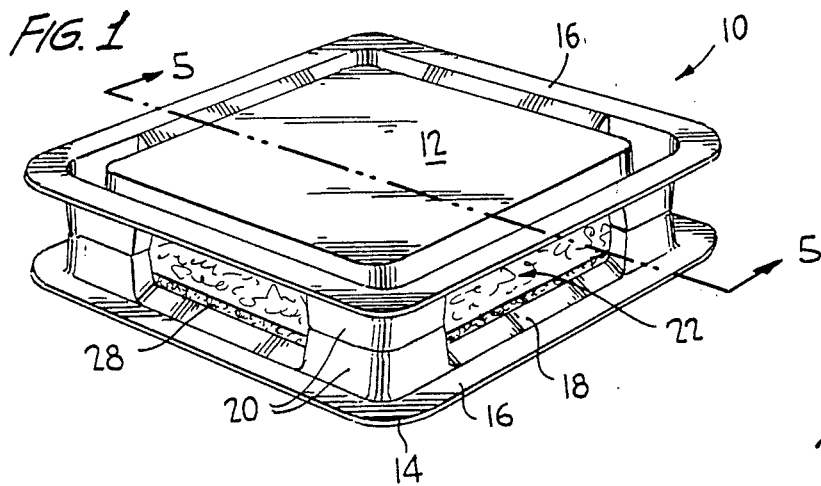
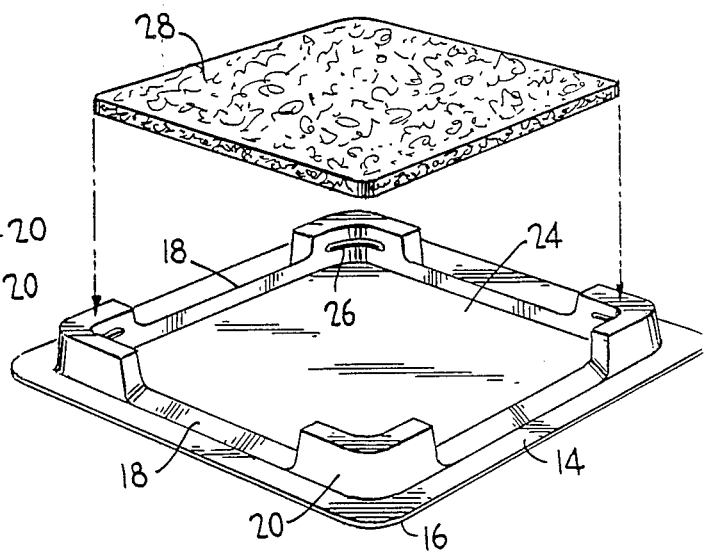
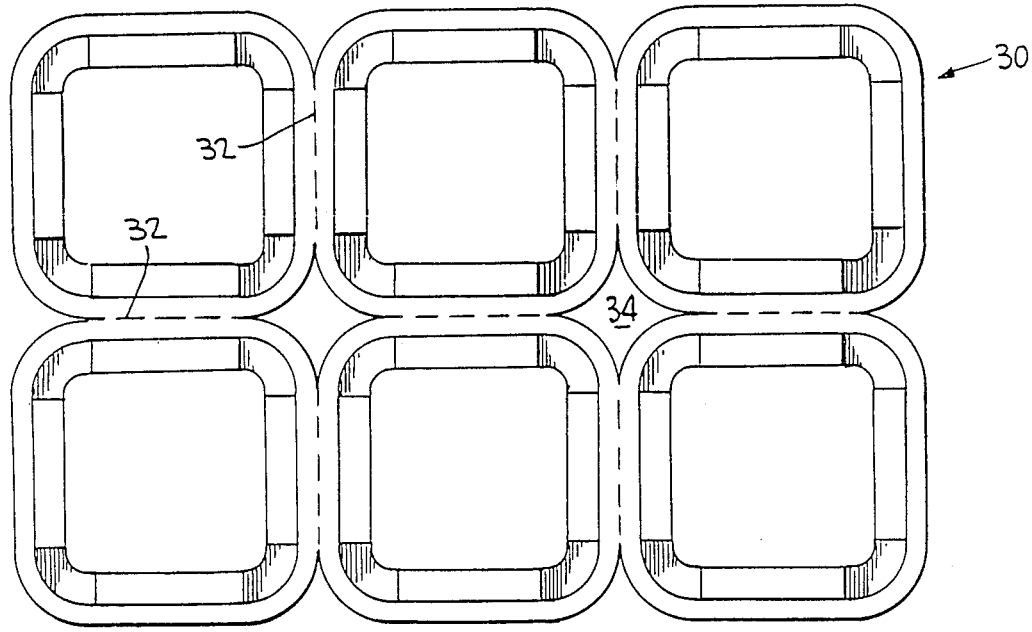

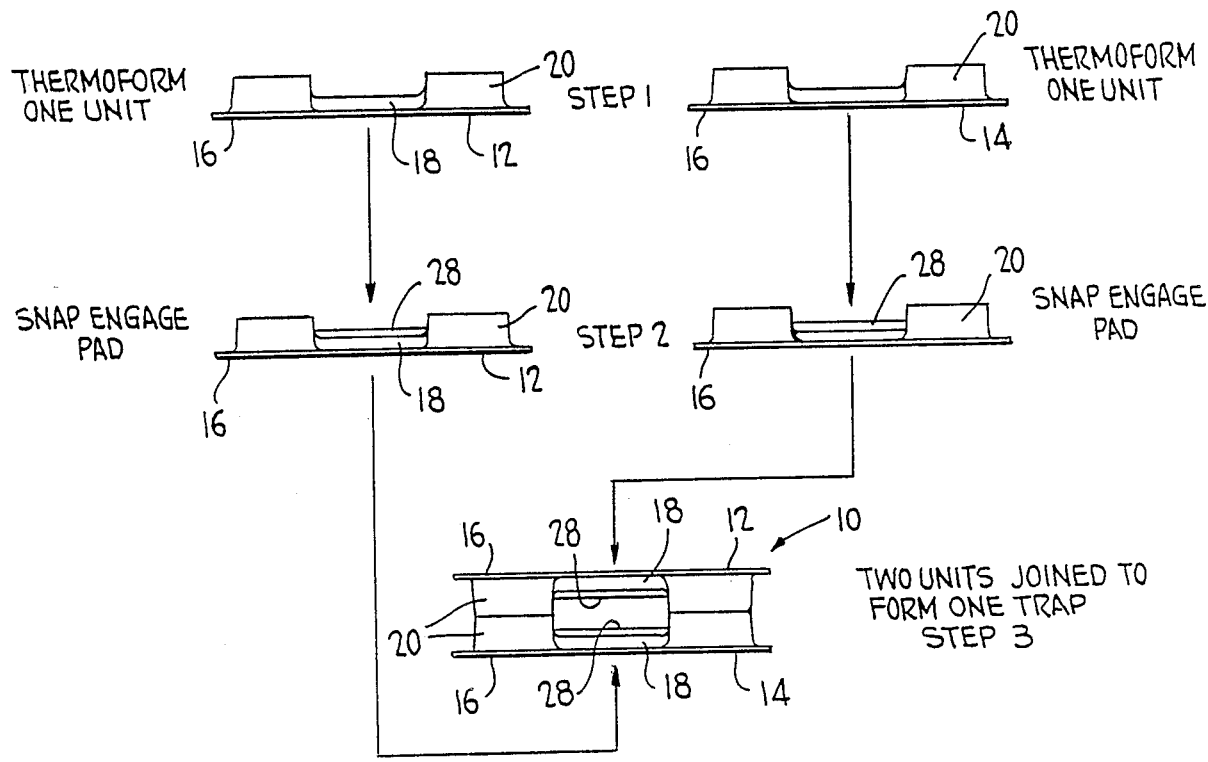

4,841,669

INSECT BAIT DEVICE

REFERENCE TO RELATED APPLICATION

This application is a division of patent application Ser. No. 69,338, filed July 2, 1987, the benefit of which is now claimed for purposes of priority pursuant to 35 USC § 120 now U.S. Pat. No. 4,823,506.

FIELD OF THE INVENTION

This invention relates generally to insect bait devices. In particular, one aspect of this invention, which is utilized to exterminate roaches and other crawling insects, relates to an insect bait device, while another aspect of the present invention relates to a method of manufacturing such an insect bait device. A further aspect of the present invention relates to a bait device housing that includes substantially identical first and second housing portions. Yet another aspect of the present invention relates to an absorbent pad that is snap-engageable in at least one of the housing portions, while a still further aspect relates to a contact-type insecticidally-active composition that is impregnated on the pad.

BACKGROUND OF THE INVENTION

A wide variety of insect bait devices, for exterminating insects and particularly roaches, are known in the art. However, the known insect bait devices are, for the most part, complex devices which are either expensive to manufacture, do not provide for ease of use by the consumer, or are generally ineffective for their intended purpose. Moreover, the known insect bait devices having housings with different top and bottom portions often lead to increased manufacturing costs, and typically require that the bait device be oriented in a specific manner when utilized for insect-exterminating purposes.

Generally, the known insect bait devices comprise a housing having a top portion and a bottom portion. Such a bottom housing portion typically includes means for allowing entry of an insect into the bait device, and further typically includes a baiting ingredient or attractant for attracting the insect into the device. After being drawn into the bait device by the attractant, the insect is typically subjected to an insecticide material.

Generally, insecticide materials comprise either (1) an insecticide that is adapted to be ingested by the insect for causing insect extermination (hereafter referred to as an "ingestable" insecticide), or (2) an insecticide that is adapted to come into contact with the insect body so as to be either absorbed through the insect body and/or ingested by the insect while grooming, for causing extermination of the insect (hereafter referred to as a "contact-type" insecticide).

Specific examples of prior art insect bait devices include the following U.S. Patents.

U.S. Pat. No. 529,109 to Burgess discloses a roach trap having a box-like bottom portion that is adapted to retain an insect attractant together with an insecticide, has a screened top portion, and has tubes designed to allow the insect to enter but not leave the trap.

U.S. Pat. No. 1,372,780 to Schenke discloses an insect bait device having a housing comprised of a bottom (base) portion and a top (dome) portion, wherein the housing dome defines openings for entry of the insect. The dome (which includes integral, radially-disposed outwardly-extending flanges) and the base portions are secured together by means of a tubular socket that is integral with the base. The tubular socket circumferentially extends from the base and is designed to receive and engage the dome flanges. A pad, treated with an insecticide, is loosely supported on the base. The pad is held in place in the housing by the socket-engaged flanges which urge the pad against the base.

U.S. Pat. No. 2,315,772 to Closs discloses a bait device for exterminating insects, comprising a sheet-like material having a nap surface on one face thereof, with a contact-type insecticide distributed throughout the nap surface. Upon grooming, the insect is alleged to ingest the insecticide and thereby become exterminated. This patent further discloses an insect bait device housing defining an opening that allows insects to enter the device, wherein the housing comprises a bottom (base) portion with connecting sidewalls and a top (cover) portion, and wherein the insect bait device contains an insect baiting ingredient secured between the bottom and top housing portions. The sheet-like material can be secured to each of the base and cover housing portions.

U.S. Pat. No. 4,563,836 to Woodruff et al. discloses an insect-feeding station comprising a housing that includes a bottom (base) portion with sidewalls which define openings for the insect. The insect-feeding station contains an insect attractant and an insecticide, and further includes a top (cover) portion that is secured to the base by an adhesive. This patent teaches utilizing a one-piece thermoformed base having an inner guide and baffle walls to conceal the poison that is to be injested by the insect. This patent further discloses a method of manufacture whereby a sheet of plastic is vacuum-formed over a mold to form a plurality of base-portion units.

Additional U.S. Patents disclosing various types of insect bait devices include the following: U.S. Pat. Nos. 2,328,590; 2,328,591; and 2,340,256, all to Weil; U.S. Pat. No. 3,931,692 to Hermanson; U.S. Pat. No. 4,031,653 to Jordan; and U.S. Pat. No. 4,395,842 to Mangulies. Each of these patents discloses an insect bait device housing having a bottom (base) portion and top (cover) portion of different construction.

Still further, various types or forms of specific, ingestable-type or contact-type insecticide compositions are well known in the art. For example, U.S. Pat. No. 3,152,040 to Fondren teaches the incorporation of a specific insecticide composition into an absorbent article. The insecticidal material utilized in this patent, in particular, is a molecular complex of piperazine and carbon disulfide. The specific insecticide composition taught is utilized in combination with an attractant, a surfactant, and water.

Additional patents disclosing other specific insecticidal compositions known in the art include U.S. Pat. No. 2,011,428 to Voorhees; U.S. Pat. No. 2,091,935 to Remy et al.; U.S. Pat. No. 2,172,689 to O'Kane et al.; U.S. Pat. No. 2,875,128 to Kirkpatrick et al.; U.S. Pat. No. 3,184,380 to Woods; U.S. Pat. No. 3,325,355 to Goodhue; U.S. Pat. No. 3,632,631 to Wright; U.S. Pat. No. 3,826,036 to Neugebauer; U.S. Pat. No. 4,049,460 to Broadbent; U.S. Pat. No. 4,332,792 to Kohn et al.; U.S. Pat. No. 4,388,297 to Naffziger; and U.S. Pat No. Re. 24,184 to Sanders et al.

The prior-art insect bait devices, as exemplified by the above-discussed and otherwise mentioned patents, have generally been found to be either complex, expensive, or ineffective. That is, the patents discussed above disclose various methods of manufacturing insect bait devices, which methods are, for the most part, complex, time-consuming, or expensive to reduce to practice. More particularly, the prior art insect bait devices have not provided the user with an effective, simple, and inexpensively-constructed insect bait device having housing portions that are so constructed as to enable the device to be oriented on either its "top" or "bottom" surfaces.

OBJECTS AND SUMMARY OF THE INVENTION

The present invention overcomes the disadvantages of the insect bait devices of the prior art, including those mentioned above, in that it comprises a novel insect bait device, relatively simple to manufacture as well as simple in construction, for extermination of crawling insects, particularly roaches, ants, and the like.

Accordingly, it is an object of this invention to provide an insect bait device comprising a generally low-profile (i.e. "squat"-shaped) housing that includes substantially identical upper and lower housing portions, and that is provided with means for allowing entry of a crawling insect into the housing, wherein at least one of the housing portions contains an absorbent pad impregnated with a contact-type insecticidally-active composition, for causing extermination of the insect in the insect bait device housing.

It is a further object of the invention to provide an insect bait device which is simple, efficient, and inexpensive to manufacture.

Yet another object of the invention is to provide an insect bait device comprising a two-piece housing that includes substantially identical upper (cover) and lower (base) housing portions, each such housing portion defining a cavity, and wherein the insect bait device includes means for removably retaining (within the housing) the pad impregnated with the contact-type insecticidally-active composition.

It is a more particular object of this invention to provide a generally low-profile two-piece insect bait device, comprising a housing that includes substantially identical upper (cover) and lower (base) housing portions, in order that either housing portion may constitute the "bottom" portion of the housing, so that, when it is desirable to insert a pad in each of the housing portions, such an insect bait device is able to provide the user with an insect bait device that can be placed in its environment on either of the housing portions without regard to specific orientation of the device, an especially important consideration when the insect bait device is to be placed in hard-to-reach or out-of-the-way places.

It is a further object of the invention to provide an insect bait device containing a pad impregnated with a new and effective contact-type insecticidally-active composition, for the extermination of insects.

The insect bait device of the present invention comprises a housing that includes substantially identical first (upper) and second (lower) housing portions. This housing defines openings to allow entry by an insect into the insect bait device. The housing portions can be joined together by any suitable means. Each of the housing portions defines a cavity for receiving a relatively-stiff yet absorbent pad; and each such housing portion further defines means for removably retaining, preferably by snap-engagement, the pad in the cavity thereof. The insect bait device further contains, in at least one of the housing portions thereof, such a pad impregnated with a novel contact-type insecticidally-active composition.

In one preferred embodiment of the present invention, the insect bait device is manufactured so as to contain one such contact-type insecticidally-active composition-impregnated pad.

In yet another preferred embodiment, each of the first and second housing portions contains such a pad, to provide for more efficient extermination of insects, and further, to provide for easy placement of the insect bait device by the user, as either housing portion of the bait device housing may function as the "bottom" of the insect bait device. This aspect of the present invention is particularly important when the insect bait device is to be placed in hard-to-reach or out-of-the-way places, such as under sinks, in attics, in crawl spaces, behind kitchen and washroom appliances, or in like places.

The insect bait device of the present invention is relatively simple in construction, generally efficient in operation, and typically inexpensive to manufacture. For example, the two-piece insect bait device housing comprises (as mentioned above) substantially identical housing portions, thereby requiring only one mold for making the housing. This, accordingly, has the effect of substantially reducing manufacturing time and attendant costs.

Additionally, the housing portions can be manufactured as a plurality of housing-portion insect bait device units. That is, the individual insect bait device units of each such plurality can be manufactured so as to be held together by a serrated, frangible joint, thereby enabling such a plurality of units to be thus-manufactured by, e.g., known thermoforming methods, to provide a plurality of individual insect bait device units, such as a "six-pack" of insect bait devices. Advantageously, individual insect bait device units can easily be removed from the remainder of the units of the pack and thereafter placed in service.

The novel insect bait device of the present invention is preferably utilized in combination with a novel contact-type insecticidally-active composition, which is used to imgregnate the absorbent pad. This composition comprises about 0.02% to about 2.0% of a contact-type insecticidally-active ingredient; about 0.05% to about 0.75% of a preservative; about 0.5% to about 5.0% of a surfactant having an HLB value of at least about 10 to provide an oil-in-water emulsion; wherein the remainder of the composition is an effective amount of a material selected from the group consisting of insect-feeding stimulants, insect attractants, and mixtures thereof, for causing crawling insects to be drawn toward or attracted to the composition, and wherein the remainder further includes an effective amount of water for forming the oil-in-water emulsion. The percentages of the various above-named ingredients of the novel contact-type insecticidally-active composition are based upon total weight of the composition.

BRIEF DESCRIPTION OF THE DRAWINGS

Other aspects, objects, advantages, and novel features of the present invention will become apparent to those skilled in the art from the following detailed description of the invention when considered in conjunction with the accompanying drawing figures, in which like reference numerals are used to designate like parts, and wherein:

FIG. 1 is a perspective view of one embodiment of the insect bait device of the present invention;

FIG. 2 is a partially-exploded view of a lower portion of the insect bait device depicted in FIG. 1 (the remainder of the device being removed for purposes of clarity;

FIG. 3 is a side view of the insect bait device depicted in FIG. 1, on a relatively-slightly reduced scale relative thereto;

FIG. 4 is a plan view of a plurality of insect bait device units, on a reduced scale relative to FIGS. 1, 2 and 3;

FIG. 5 is a cross-sectional view of the insect bait device of the invention, taken along line 5—5 of FIG. 1; and FIG. 6 is a process flow (i.e. "schematic") diagram of one preferred method of manufacture of the insect bait device of the present invention, depicting the device on a reduced scale relative to FIGS. 1 and 2.

DETAILED DESCRIPTION OF THE INVENTION

Referring to the drawing figures, the insect bait device of this invention comprises a housing 10 having substantially identical first and second housing portions 12 and 14, respectively, providing a plurality of means 22 for entry into the housing 10 by an insect. Housing portions 12 and 14 may be made of any generally lightweight, inexpensive, and disposable material. Preferred materials are thermoformable plastics such as polyvinyl chloride (PVC), acrylonitrile-butadiene-styrene (ABS) copolymers, polypropylene (PP), polystyrene (PS), and other suitable polymeric materials or like substances having similar thermoformable characteristics. Particularly preferred plastics are PVC polymers or ABS copolymers, with rigid PVC polymer being especially preferred.

Housing portions 12 and 14 can be joined together by any suitable, conventional means such as by sonic welding, by radio-frequency welding, by solvent-bonded welding, by heat sealing, or by utilizing suitable adhesives. One preferred manner of joining together the housing portions is by solvent-bonded welding using a methylethyl ketone-based solvent; another preferred manner utilizes radio-frequency welding.

The housing portions are formed by conventional processes such as thermoforming, vacuum forming or injection molding. A preferred method of forming the housing portions is by known thermoforming processes. Preferably, each housing portion 12 and 14 has four sidewalls; and each such sidewall pair (i.e., after the housing portions are joined together, as mentioned above) preferably defines one of the plurality of entry means 22.

As shown in FIGS. 1, 3, 5, and 6, housing portions 12 and 14 are substantially identical and when joined to each other provide an insect bait device which may be placed, relative to the surface of its intended environment of use, on an integral flange 16 of either of housing portion 12 or 14, the surface-contacting flange 16 thereby providing the housing with a base.

Housing portions 12 and 14, as mentioned above, are formed from the same mold and are therefore substantially identical. Accordingly, the structure of housing portion 14, as best shown in FIG. 2, will now be described in detail with the understanding that housing portion 12 (which is not shown in FIG. 2) is substantially the same as housing portion 14.

Housing portion 14 includes the flange 16, a ridge 18, and shoulders 20 which define the sidewalls (mentioned above). As shown in, e.g., FIGS. 1, 3 and 5, the joined-together housing portions 12 and 14 provide the above-mentioned entry means 22. While a preferred embodiment of the invention includes four such openings 22, it is to be understood that the insect bait device may be of different shape (e.g., pentagonal, hexagonal, etc.) in plan view, and may, therefore, include any suitable number of insect bait device-entry openings for the insect.

Ridges 18 as well as shoulders 20, both integral with and extending from flange 16, define a central cavity 24 (FIG. 2). Additionally, each of the upstanding shoulders 20 includes an integral ledge 26 (FIGS. 2 and 5) that extends inwardly into the cavity 24. The shoulders 20, moreover, are so designed as to collectively removably retain, preferably by snap-engagement, a relatively-stiff absorbent pad material 28 of suitable dimension in cavity 24. That is, pad 28 is so dimensioned, relative to the dimensions of cavity 24 (such dimensions being defined by ridges 18 and shoulders 20), as to be urgeable past the ledges 26, utilizing a relatively minor amount of force. For example, the pad can be rectangular in shape, or can be shaped as a trapezium, a trapezoid, a rhombus, a rhomboid, etc., although a square-shaped pad is preferred. Regardless, the housing portion cavity 24 is sized relative to the shape of the pad 28 so as to be slightly larger than the pad 28 for enabling the pad 28 to snugly, yet somewhat freely, be urgeable into the housing portion cavity 24 and be snap-engageable therewith, as provided by the construction and arrangement of the inwardly-directed ledges 26.

The pad 28 is preferably impregnated with a novel contact-type insecticidally-active composition, and pad 28 is removably retained in cavity 24 of one or both of the housing portions 12 and 14, preferably by snap-engagement. Pad 28, as mentioned above, is preferably relatively stiff, and further is preferably relatively tightly received in cavity 24.

While one preferred embodiment (not shown) of the present invention includes a pad 28 snap-engaged in only one of the housing portions 12 or 14, yet another preferred embodiment of the present invention includes such a pad 28 in each of the housing portions 12 and 14 (FIGS. 3 and 5) in order to provide an insect bait device which can be placed on either of the flanges 16, i.e. the "upper" or the "lower" of the respective housing portions.

While the illustrated embodiment of the housing 10 as well as the cavity 24 and pad 28 of the insect bait device of the present invention are all generally square in shape, it is to be understood that the complementary geometry of both the cavity 24 and the pad 28 can be manufactured in a number of other shapes such as octagonal, hexagonal, pentagonal, rectangular, trapezium, trapezoid, rhombus, rhomboid, triangular, and the like. Additionally, while the preferred embodiment of the invention discloses use of an integral ledge 26 on each of the shoulders 20, it is to be understood that other means for securing the pad in cavity 24 may be utilized, such as using two opposed ledges only, or using a suitable adhesive material.

Further, the pad 28 can be constructed of conventional materials so long as such a pad is capable of being impregnated with a suitable insecticidally-active composition. For example, absorbent pad 28 can be made of absorbent paper, can include certain foils, or may be manufactured from a suitable, commercially-available absorbent polymeric material or other absorbent substance. A particular, presently preferred pad material is manufactured of relatively-stiff, absorbent paper.

The insect bait device of the present invention, as briefly mentioned above, is manufactured in a simple, efficient, and inexpensive manner due to the utilization of substantially identical housing portions 12 and 14. A presently preferred method of manufacturing the insect bait device of the present invention is to manufacture a plurality of the insect bait devices in order to provide an economic manner of manufacture and also to permit the insect bait devices of this invention to be sold to the consumer as a plurality of insect base device units. For example, as shown in FIG. 4, the insect bait device can be sold as a six-pack 30 of insect bait device units joined together by serrated, frangible joints 32 which in turn define waste-plastic interstices 34. Of course, the insect bait devices can just as well be manufactured and sold as a 9-pack of such units, a 12-pack, etc., if desired. The presence of the serrated, frangible joint 32 enables one of the insect bait device units to be readily removed from the remainder of the units. The consumer, at his or her election, accordingly, can use a plurality of such insect bait device units, thus-joined together, or the consumer can separate the units for individual use as desired.

One preferred method of manufacturing the insect bait device of the present invention is shown in FIG. 6. The illustrated method, together with yet another preferred method, will now briefly be discussed. Specifically, the method of manufacturing the insect bait device of the present invention comprises the steps of thermoforming, from a suitable, deformable plastic material or like substance, substantially identical first and second housing portions 12 and 14 (step 1); snap-engaging a pre-dimensioned relatively-stiff pad 28 into only the first housing portion 12 (step not shown) or into only the second housing portion 14 (step not shown) or into each of the housing portions 12 and 14 (step 2); and joining the first and second housing portions 12 and 14 together by a suitable housing portions-joining step, whereby an insect bait device unit is produced (step 3). In particular, if the housing portions 12 and 14 are made of rigid PVC, the preferred manner of joining utilizes radio-frequency welding.

Thus, one feature of the present invention is that the manufacturing method provides cost-and-processing efficiencies in that an insect bait device housing unit is fabricated from substantially identical housing portions.

It is to be further understood that the step which includes insertion of the absorbent pad 28 (i.e., step 2 of FIG. 6) can include yet another step (step not shown) whereby the contact-type insecticidally-active composition is applied to the pad. Alternatively, the composition can be applied onto such a pad 28 after the housing portion units are joined together to form the insect bait device housing (i.e., after step 3 of FIG. 6) if desired.

As noted above, it is a preferred method of manufacture to produce a joined-together plurality of the insect bait device units (FIG. 4) to reduce manufacturing costs of an individual unit, and to provide a plurality of insect bait device units for sale to the consumer. A plurality of insect bait device units are manufactured by substantially the same process as shown in FIG. 6 with the addition of a step for forming the serrated, frangible joints 32 and interstices 34, shown in FIG. 4, during or after the thermoforming step (i.e., step 1 of FIG. 6).

Also, as briefly mentioned above, while the illustrated embodiment depicts a pad 28 in each of the housing cavities 24, it is to be understood that the illustrated method of manufacture can readily be altered so that the insect bait device of the present invention can have a pad 28 in only one of the housing portion cavities 24.

As separately briefly mentioned above, absorbent pad 28 is preferably impregnated with a novel contact-type insecticidally-active composition that is characterized as an oil-in-water emulsion. A preferred contact-type insecticidally-active composition is an emulsion comprising about 0.02% to about 2.0% of a contact-type insecticidally-active ingredient; about 0.05% to about 0.75% of a preservative; about 0.5% to about 5.0% of a surfactant having an HLB value of at least about 10 to provide the oil-in-water emulsion. The remainder of the insecticide composition is an effective amount of a material selected from the group consisting of insect-feeding stimulants, insect attractants, and mixtures thereof, for drawing crawling insects to the composition, together with an effective amount of water, for forming the oil-in-water emulsion. The percentages of the various above-named ingredients of the insecticidally-active composition are based upon total weight of the composition.

Preferred contact-type insecticidally-active ingredients include chlorpyrifos, propoxur, isofenphos, acephate, carbamates, organophosphates, chlorinated hydrocarbon insecticides, and any pyrethroids which are not insect repellents, and combinations of the above. See, e.g., *The Merck Index*, 10th Ed., or *Pesticides Theory And Application*, by George W. Ware, both published in 1983.

Suitable preservatives include 5-chloro-2-methyl-4-isothiazolin-3-one (presently commercially-available, for example, under the trade name Kathon CG), formaldehyde, sodium benzoate, and the like.

Suitable surfactants includes, for example, those surfactants presently commercially-available under the trade names Tween 80, Triton X-193, and Atlox 3409F (all as identified in the reference text titled *McCutheon's Emulisifier and Detergents*, North American Edition, published 1986).

Of those materials that are utilized to draw crawling insects to the novel contact-type insecticidally-active composition of the present invention, preferred attractants include pheromones and substances that possess food odors (including food materials), as well as mixtures thereof. Further, of such other materials that are utilized to draw crawling insects to the composition, preferred insect-feeding stimulants include fats (such as oils), proteins (such as corn gluten and soy protein), and carbohydrates (such as starches and sugars, e.g., dextrose, fructose, maltose, sucrose, molasses, and including combinations of sugars such as those mentioned), as well as mixtures of fats, proteins and carbohydrates.

The bait device of the present invention exhibits a so-called "dual mode" of action once an insect enters it. That is, the device is designed to kill insects via direct contact with, as well as via ingestion of, an insecticidally-active ingredient. In particular, the device not only presents an insecticidally-active surface, thereby functioning as a contact-type insecticide device, but also contains a stimulant to enhance insect feeding, for inducing an insect that is drawn into the bait device to ingest the insecticidally-active ingredient as well. For example, because the novel contact-type insecticidally-active composition includes the insecticidally-active ingredient, the pad 28 when impregnated with the contact-type insecticidally-active composition thus presents an insecticidally-active surface. Moreover, because the novel contact-type insecticidally-active composition further includes the insect attractant or other such feeding stimulant, insects in contact with the composition-impregnated pad 28 are thus not only exposed to the insecticidally-active surface via direct contact but are additionally induced to ingest the insecticidally-active ingredient because of the presence (in the novel composition) of the feeding stimulant.

A presently preferred contact-type insecticidally-active composition, characterized as an emulsion, comprises about 0.5 wt.-% of a contact-type insecticidally-active ingredient; about 0.1 wt.-% of a preservative; about 0.5 to about 1.5 wt.-% of a surfactant having an HLB value of at least about 10; about 40 wt.-% molasses; about 20 wt.-% sucrose; and the remainder being water.

The above-described invention provides a simple, effective, and efficient insect bait device and further provides a simple and inexpensive method of manufacturing the device. While the preferred embodiments of the insect bait device of the present invention have been described above in detail, various modifications and variations of the invention are possible in light of the disclosure of this invention and will be obvious to those skilled in the art. It is, therefore, to be understood that within the scope of the appended claims, the invention may be practiced otherwise than as above described.

We claim:

1. A method for manufacturing an insect bait device that includes two bait-device housing portions, the method comprising the steps of:

thermoforming from a deformable plastic material two identical housing portions, each one of said housing portions including a plurality of integral, spaced-apart upstanding shoulders defining an inner housing portion cavity of predetermined dimension, the plurality of housing-portion shoulders defining a complementary plurality of integral ledges that are inwardly disposed relative to each other and to the housing-portion cavity, said two housing portions further being thermoformed such that when joined together the thus-joined housing portions together define at least one entry means for enabling an insect to enter the insect bait device;

snap-engaging a relatively-stiff absorbent pad into one of the housing portion cavities, the relatively-stiff pad being so dimensioned relative to the housing-cavity dimensions and to the shoulders as to be snap-engageable past the ledges for removably retaining the relatively-stiff pad in the housing-portion cavity; and impregnating the relatively-stiff absorbent pad with an insecticidal composition and joining together said two housing portions in a manner such that the pad is located therebetween.

2. The method according to claim 1 wherein the joining-together step is achieved utilizing a heat-sealing step, an adhesive-applying step, a sonic-welding step, a radio frequency welding step, or a solvent bonded-welding step.

3. The method according to claim 2 wherein the joining-together step is achieved utilizing a solvent bonded welding step that employs methylethyl ketone as the solvent.

4. A method for manufacturing a plurality of insect bait device units, each one of the bait device units including two bait-device housing portions, the method comprising the steps of:

thermoforming from a deformable plastic material a first plurality of one of the two housing portions as well as a complementary, second plurality of the other of the two housing portions, the two housing portions being identical, each respective one of the two housing portions of the first and second housing-portion pluralities including integral, spaced-apart upstanding shoulders defining an inner housing portion cavity of predetermined dimension, the plurality of housing-portion shoulders defining a complementary plurality of integral ledges that are inwardly disposed relative to each other and to the housing-portion cavity, each one of the plurality of said one housing portions when joined together with a respective one of the complementary plurality of said other housing portions thereby providing the plurality of insect bait device units, and further being thermoformed such that when joined together the thus-joined housing portions define for each one of the plurality of thus-joined insect bait device units at least one entry means for enabling an insect to enter thereinto;

snap-engaging a relatively-stiff absorbent pad into each one of the housing portion cavities of one of the first and second housing portion pluralities, the relatively-stiff pad being so dimensioned relative to the housing-cavity dimensions and to the shoulders as to be snap-engageable past the ledges for removably retaining the relatively-stiff pad in the housing-portion cavity; and impregnating the relatively-stiff absorbent pad with an insecticidal composition and joining together said first and second housing portion pluralities in a manner such that each one of the plurality of pads is located within a complementary one of the plurality of insect bait device units.

5. The method according to claim 4 wherein the thermoforming step includes the step of forming a frangible joint so formed such that any one of the plurality of insect bait device units is readily removable from the remainder of the plurality of insect bait device units.

* * * * *